May 22, 1923.
J. P. BALL
APPARATUS FOR AND METHOD OF TREATING SEWAGE
Filed Feb. 14, 1921
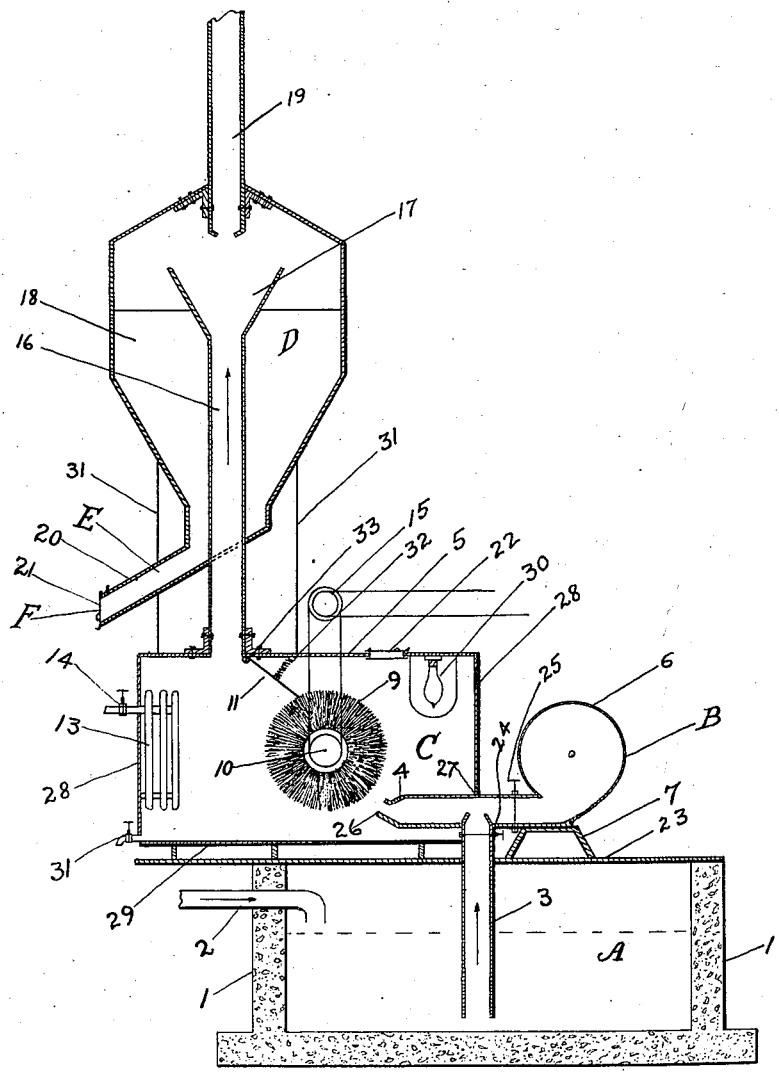
Figure 1,
Inventor,
John P. Ball, Patented May 22, 1923.

1,456,046

UNITED STATES PATENT OFFICE.

JOHN P. BALL, OF CHICAGO, ILLINOIS.

APPARATUS FOR AND METHOD OF TREATING SEWAGE.

Application filed February 14, 1921. Serial No. 445,038.

*To all whom it may concern:*

Be it known that I, JOHN P. BALL, a citizen of the United States, and resident of the city of Chicago, in the county of Cook and State of Illinois, have invented certain new and useful Improvements in Apparatus for and Methods of Treating Sewage, of which the following is a description, reference being had to the accompanying drawings, which form a part of my specification.

My invention relates to a method of separating, atomizing, drying, classifying, treating or collecting sewage sludge, trade waste and the like, through the utilization of means or mechanisms whereby the elements of heat, light, air and agitation are employed for the purpose of inducing a separation of the liquids from the solids and dispelling the sewer gas into the atmosphere.

Sludge consists of the residue which remains after the treatment of city sewage by septic tanks, bar screens and mesh screens, by plain sedimentation or by chemical precipitation, or by settling tanks and towers. The further treatment of sludge is affected by the controlled supply of heat, light, air and mechanical agitation. The free or limited supply of these four elements also controls the condition and quantity of gases evolved from sewage sludge.

The light increases and promotes the activity of the aerobic bacteria.

While the invention has been described as applied mainly to the purification of sewage and trade waste, it may also be applied to the purification of other liquids and the separation of silt or the like in water purifiers.

My invention provides improvements especially applicable to devices of this general character and in its preferred form it utilizes a sludge collecting chamber, a sludge atomizer in conjunction with a compressed air feed tube, a sludge dewatering chamber containing a take-off drum receiving the atomized sludge, a dry air blower, a steam heating coil for drying the atomized sludge, a light producing element for subjecting the atoms to concentrated light rays. My invention also provides an exhaust stack and a plurality of superimposed settling chambers located on said stack for separating the dust laden current and classifying the material in suspension, means for adjusting the air currents, means for regulating the supply of heat to the dewatering chamber and means for controlling the supply of light to said dewatering chamber.

In the accompanying drawing, which shows the preferred form of my invention, Figure 1 is a vertical axial section.

Referring to the drawing, A indicates a raw-sludge chamber, B an atomizer, C a dewatering chamber, D, a collection chamber, E, a conduit for receiving the solid particles, and F, a discharge outlet. These may be of any usual or suitable construction and arrangement capable of reducing the sludge, creating the necessary currents and collecting and discharging the products.

Referring to Figure 1, I will now describe in detail the preferred form of my invention in the adaptation therein illustrated:

The raw-sludge chamber A has a cylindrical body and a flat bottom 1 constructed of brick or concrete; it has a flat iron top 23 such as the usual sewer catch-basin; it has an intake pipe 2.

The sludge atomizer B is made up of an air blower 6 forcing air through a horizontal exhaust tube 4 across the top orifice of a vertical tube 3, the lower orifice of which is submerged in the sludge of chamber A, forming a vacuum in the tube 3, the sludge being thereby ejected through the nozzle 26. The tube 4 enters the chamber C by a tight joint 27, and the tube 3 fits tightly into the tube 4. The blower and tubes are supported on a frame 7 which is bolted to the top 23 of the sludge chamber A. When the valve 24 is closed, the supply of sludge is cut off, the blower then acts as a dry air blower, and a current of dry air is forced into the chamber C through the horizontal tube 4 and the nozzle 26. The horizontal tube 4 is provided with a valve 25 placed between the blower 6 and the entrance of the vertical tube 3 so as to control the supply of the forced air current to the chamber C. The blower 6 may be driven with any suitable power.

The sludge-reduction chamber C has a rectangular body 28 and flat top 5 and bottom 29; both top, bottom and body are flanged and bolted together so as to form an air-tight compartment and are braced so as to preserve the rectangular form of the body and to support internal parts in position.

The current of atomized sludge passing through the orifice 26 and into the chamber C is intercepted by a receiver 9 mounted in front of the nozzle 26 so as to catch the atomized current of sludge. The receiver is composed of a cylindrical brush or broom or it may be made up of a network of wire screens or texture material so as to form a great number of interstices or small spaces between the mesh or fiber which surround the hub 10. The receiver is preferably a revolving member and is axially mounted in the dewatering chamber C and driven by the mechanism 15. In operation the atomized sludge entering the interstices of the receiver deposits particles of solid material such as organic and inorganic matter therein, while the liquids will descend below receiver and eventually drain through the outlet 31.

So far described the object of the invention is to charge the receiver 9 with suspended solids from the atomized sludge so as to be as nearly free from water as may be possible. The receiver 9 being now charged or clogged with the injected sludge, the supply of atomized sludge is shut off from the chamber C by closing the valve 24, and the injected sludge in the receiver is then subjected to a treatment of oxidation. The elements employed are heat, air, agitation and light; each of these elements acting independently or collectively aid in the bacteriological treatment or in the oxidization of the sludge contained in the dewatering chamber C. The element of heat is supplied from a steam coil 13 and the degree of heat is regulated by the valve 14; the concentrated light is supplied by an electric light 30 which is encased in a glass globe; both the heat and light have a propagating effect on the bacteria in the sludge. Oxidization of the sludge having been effected, a current of forced air is then turned into the dewatering chamber, and the process of drying and cleaning the receiver takes place. At this time the receiver may be rotated in an opposite direction to the incoming current of air, in order to give a more cleansing effect to the interstices of the receiver.

It is evident that in subjecting the sludge on the revolving receiver to these processes dust or dried sludge is produced and this eventually finds its way through the tube 16 to the exhaust orifice 17 and finally into the dust collecting drum 18.

The dried-sludge chamber D is constructed of suitable material such as sheet iron and may be made in sections and bolted together and braced by tie rods 31. The dried sludge enters the dust collecting chamber by the tube 16 through the orifice 17 and the dust is expanded in the drum 18 and is driven to the outer edge of the chamber and falls by gravity to the tube 20 and thence to the clean-out door 21. The dried-sludge chamber is also provided with a final blowoff tube 19.

It will be understood that the invention is not limited to one dried-sludge chamber, as many may be employed as to perfect a complete separation of the dust laden current.

The sludge dewatering chamber is provided with a glass door 22 for examining the contents and the receiving drum has a clean off blade 11 which is hinged to the top of the chamber at 33 and attached to a compression spring 32 and is operative when the receiver is revolved. The dewatering chamber is also provided with a drip pipe and valve 31 and may be operated to drain such liquid that remains in the dewatering chamber.

What I claim is:

1. The herein described method which consists in atomizing a sludge, discharging the same into a closed chamber and subjecting the sludge laden current to light, heat and agitation and independently drawing off the separated portions.

2. The herein described method which consists in atomizing a sludge, discharging said atomized sludge into a closed chamber, subjecting the atomized sludge in said chamber to heat and a forced current of air and collecting the dried particles while allowing the noxious gases to escape.

3. Apparatus of the character described, comprising a sludge chamber, a dewatering chamber, air current producing means adapted to discharge a current of air into the dewatering chamber and having connection with the first mentioned chamber, means for closing the connection with the sludge chamber, means rotatably mounted in said dewatering chamber adjacent said air current, means adapted to receive and collect the particles of solid matter entrained with the air current while allowing the liquid to drain therefrom into the bottom of the dewatering chamber, means for heating the dewatering chamber, and means disposed about the outlet of said dewatering chamber, for allowing the air and noxious gases to escape, and to collect the particles entrained with the outgoing air.

4. Apparatus of the character described, comprising a sludge chamber, a dewatering chamber, means for delivering a current of air into said dewatering chamber, said means having connection with the sludge chamber at a point in advance of the point of delivery into the dewatering chamber, means for closing the connection with the sludge chamber, means mounted in said dewatering chamber adjacent to the delivery end of said first means and adapted to collect the entrained particles of solid matter while allowing the liquid to separate therefrom, means for heating said dewatering chamber, and means disposed about the delivery end of said dewatering chamber adapted to collect the particles passing out of said dewatering chamber with the outgoing air, and permitting the air and noxious gases to escape.

5. Apparatus of the character described, comprising a sludge chamber, a dewatering chamber, controllable air injecting means communicating with one end of the dewatering chamber and having a controllable connection with the sludge chamber, a movable collector element mounted in the dewatering chamber adjacent to the delivery end of said injecting means adapted to separate the solids from the liquid, means for removing the collected particles from said collector element, when the latter is actuated, means in said dewatering chamber for heating same, and a collecting chamber, arranged at the delivery end of the dewatering chamber, for collecting the dried particles and allowing the air and gases to escape.

6. Apparatus of the character described, comprising a sludge chamber, a superposed dewatering chamber, an air blower, a valve conduit for delivering the air into said dewatering chamber, a second conduit communicating with the sludge chamber and with said first conduit in advance of its connection with said dewatering chamber, means arranged in the dewatering chamber adjacent to the delivery end of said conduit, for separating the suspended solid from the liquid, means actuating said first means, means located in the dewatering chamber for heating said chamber, means for producing artificial light in said chamber, a delivery tube leading from the top of the dewatering chamber, and a collecting drum disposed about the delivery end of said tube.

JOHN P. BALL.

Witnesses:
  CECIL E. BALL,
  RUSSELL J. BALL.